Patented Sept. 4, 1923.

1,466,683

UNITED STATES PATENT OFFICE.

ARTHUR ULLRICH, OF FRANKFORT-ON-THE-MAIN, GERMANY.

PROCESS OF MANUFACTURE OF DIPHENYLENE DIKETONES AS ANTHRAQUINONE OR ITS DERIVATIVES.

No Drawing.   Application filed August 9, 1921.   Serial No. 491,025.

*To all whom it may concern:*

Be it known that I, ARTHUR ULLRICH, a citizen of Germany, residing at Myliusstreet 58, Frankfort-on-the-Main, Germany, have invented certain new and useful Improvements in Processes of Manufacture of Diphenylene Diketones as Anthraquinone or its Derivatives (for which I have filed applications in Germany, December 1, 1919; Austria, November 29, 1920; Hungary, December 3, 1920; Czechoslovakia, December 14, 1920; Switzerland, December 1, 1920; Denmark, December 2, 1920; Sweden, January 10, 1921; Norway, December 10, 1920; Netherlands, November 29, 1920; Belgium, February 26, 1921; Italy, December 18, 1920; France, December 14, 1920; and in Great Britain, January 5, 1921), of which the following is a specification.

The present process refers to the manufacture of diphenylene diketones as anthraquinone or its derivatives by oxidation of anthracene compounds. It refers for instance to the manufacture of anthraquinone from anthracene, oxanthranol, monochloranthracene, dichloranthracene, etc., or of sulphonic acids of anthraquinone from anthracene sulphonic acids by means of oxygen.

It is known that one may manufacture diphenylene diketones as anthraquinone or its derivatives from anthracene or its derivatives by means of nitric acid or oxides of nitrogen or by oxidizing agents as chromic acid. The use of nitric acid and such like has the defect that impurities are formed which even after repeated sublimation or recrystallization of the anthraquinone are separated only with difficulty and greatly affect the working up of the product.

The present process avoids the said detriments of the hitherto known processes.

The process consists in that one adds a relatively small amount say ½ to 1 per cent of any metal nitrite, especially alkali nitrite, preferably sodium nitrite in solid dry form, to a mixture of the anthracene compounds and organic acids free of water and that one causes oxygen or oxygen containing gases or vapours as for instance air to act on the anthracene as oxidizing agent during warming and if desired under pressure. A particular feature of the present process is that it works without the use of nitric acid added from the beginning of the process or formed during the process and under exclusion of water. One must fix the water formed during the reaction by addition of substances suitable to withdraw water or combining with water as for instance sodium sulphate, dehydrated calcined sodium-acetate, organic acid anhydrides, as acetic anhydride, propionic acid anhydride, phtalic acid anhydride. Further oxygen carriers or catalysts may be used, as for instance manganese dioxide, barium superoxide.

Besides the organic acids mixtures of organic acids free of water and neutral solvents may be used, and especially such neutral solvents as cannot be used in presence of nitric acid. A suitable neutral solvent is for instance dichlorbenzene $C_6H_4Cl_2$.

The following examples illustrate the invention:

(1.) 100 kilos of anthracene of 95 per cent strength are heated at about 90° C. while stirring in a closed vessel with 500 kilos of anhydrous acetic acid and about 60 kilos of acetic anhydride; 0.5–1 kilo of solid sodium nitrite is added and oxygen is introduced under pressure. There occurs immediately a vigorous absorption and after some hours the oxidation is finished. After cooling the anthraquinone is filtered and washed with some glacial acetic acid. The anhydrous solvent can be distilled and used again. The yield in anthraquinone amounts to 95 per cent; the melting point is 283° C; the product contains 99–100 per cent of anthraquinone.

(2.) A mixture of 100 kilos of anthracene of 95 per cent strength, 200 kilos of anhydrous propionic acid, 200 kilos of benzene and 16 kilos of dehydrated sodium acetate is treated as described in example 1. The reaction is in most cases complete in some hours. The yield and purity of the anthraquinone obtained agree with those stated in example 1.

(3.) 100 kilos of anthracene of 40 per cent strength are heated at about 90° C. while stirring in a closed vessel with about 300 kilos of glacial acetic acid and about 100 kilos of acetic anhydride; 0.5–1 kilo of solid sodium nitrite is added and oxygen is introduced under pressure and treated as described in example 1. The yield in anthraquinone amounts to about 95 per cent of the theory, the melting point is 279–280° C., the product contains 96–98 per cent of anthraquinone.

Having now particularly described and ascertained the nature of my said invention and in what manner the same is to be performed I declare that what I claim is:

1. The process for manufacturing diphenylene diketones which comprises adding a relatively small amount of a solid dry metal nitrite to a mixture containing an anthracene compound, an organic acid free of water, and a substance capable of binding water, heating the mixture, and conducting oxygen containing gas through the mixture.

2. The process for manufacturing diphenylene diketones which comprises, adding solid dry metal nitrite to a mixture containing an anthracene compound, an organic acid free of water, and a substance capable of binding water; heating the mixture and treating the same with oxygen under superatmospheric pressure.

3. The process for manufacturing diphenylene diketones which comprises, adding solid dry sodium nitrite to a mixture containing an anthracene compound, an organic acid free of water, a substance capable of binding water, and a neutral organic solvent, heating the mixture and conducting oxygen containing gas through the same under superatmospheric pressure.

4. The process for manufacturing diphenylene diketones which comprises, adding to a mixture containing an anthracene compound and an organic acid free of water a relatively small amount of a metal nitrite and an oxygen carrier, heating the mixture and contacting the same with oxygen under superatmospheric pressure.

5. The process for manufacturing diphenylene diketones which comprises mixing 100 parts of an anthracene compound with an organic acid free of water, a substance capable of binding water, dichlorbenzene, from 0.5 to 1.0 part of sodium nitrite, and manganese dioxid, heating the mixture and passing oxygen through the same under superatmospheric pressure.

In testimony whereof I hereunto affix my signature.

ARTHUR ULLRICH.